US012597677B2

(12) United States Patent
Ono et al.

(10) Patent No.: US 12,597,677 B2
(45) Date of Patent: Apr. 7, 2026

(54) LDH SEPARATOR

(71) Applicant: NGK INSULATORS, LTD., Nagoya (JP)

(72) Inventors: Shumpei Ono, Nagoya (JP); Sho Yamamoto, Nagoya (JP); Naoko Inukai, Nagoya (JP); Shohei Yokoyama, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 587 days.

(21) Appl. No.: 18/146,580

(22) Filed: Dec. 27, 2022

(65) Prior Publication Data

US 2023/0135365 A1 May 4, 2023

Related U.S. Application Data

(63) Continuation of application No. PCT/JP2021/028158, filed on Jul. 29, 2021.

(30) Foreign Application Priority Data

Aug. 11, 2020 (JP) ................................. 2020-136069

(51) Int. Cl.
| | |
|---|---|
| *H01M 50/446* | (2021.01) |
| *H01M 8/0243* | (2016.01) |
| *H01M 8/083* | (2016.01) |
| *H01M 10/054* | (2010.01) |
| *H01M 50/491* | (2021.01) |

(52) U.S. Cl.
CPC ....... *H01M 50/446* (2021.01); *H01M 8/0243* (2013.01); *H01M 8/083* (2013.01); *H01M 10/054* (2013.01); *H01M 50/491* (2021.01)

(58) Field of Classification Search
CPC ............. H01M 50/446; H01M 50/491; H01M 8/0243; H01M 8/083; H01M 10/054
See application file for complete search history.

(56) References Cited

U.S. PATENT DOCUMENTS

| | | | |
|---|---|---|---|
| 9,293,791 | B2 | 3/2016 | Yamada et al. |
| 10,290,847 | B2 | 5/2019 | Kitoh et al. |
| 2017/0214019 | A1 | 7/2017 | Yokoyama et al. |
| 2019/0280271 | A1 | 9/2019 | Okochi et al. |
| (Continued) | | | |

FOREIGN PATENT DOCUMENTS

| | | |
|---|---|---|
| JP | 2019-117780 A | 7/2019 |
| JP | 2020-098779 A | 6/2020 |
| (Continued) | | |

OTHER PUBLICATIONS

International Search Report and Written Opinion (with English translation) dated Oct. 12, 2021 (Application No. PCT/JP2021/028158).

*Primary Examiner* — Karie O'Neill Apicella
(74) *Attorney, Agent, or Firm* — BURR PATENT LAW, PLLC

(57) ABSTRACT

There is provided an LDH separator including a porous substrate and a hydroxide ion-conductive layered compound that is a layered double hydroxide (LDH) and/or a layered double hydroxide (LDH)-like compound, filling up pores of the porous substrate. The proportion of the hydroxide ion-conductive layered compound in the LDH separator is 25 to 85% by weight.

10 Claims, 2 Drawing Sheets

(56) References Cited

U.S. PATENT DOCUMENTS

2020/0313133 A1     10/2020   Takeuchi et al.
2021/0218112 A1 *    7/2021   Yamamoto .......... H01M 50/449

FOREIGN PATENT DOCUMENTS

WO        2013/118561  A1      8/2013
WO        2016/067884  A1      5/2016
WO        2016/076047  A1      5/2016
WO        2019/124212  A1      6/2019
WO        2019/124270  A1      6/2019
WO     WO-2020121673  A1 *   6/2020    .......... H01M 50/449

* cited by examiner

LDH SEPARATOR

CROSS-REFERENCE TO RELATED APPLICATIONS

This application is a continuation application of PCT/JP2021/028158 filed Jul. 29, 2021, which claims priority to Japanese Patent Application No. 2020-136069 filed Aug. 11, 2020, the entire contents all of which are incorporated herein by reference.

BACKGROUND OF THE INVENTION

1. Field of the Invention

The present invention relates to an LDH separator.

2. Description of the Related Art

In zinc secondary batteries such as nickel-zinc secondary batteries and air-zinc secondary batteries, metallic zinc precipitates from a negative electrode in the form of dendrites upon charge, and penetrates into voids of a separator such as a nonwoven fabric and reaches a positive electrode, which is known to result in bringing about short-circuiting. The short circuit due to such zinc dendrites shortens a life in repeated charge/discharge conditions.

In order to deal with the above issues, batteries including layered double hydroxide (LDH) separators that prevent penetration of zinc dendrites while selectively permeating hydroxide ions, have been proposed. For example, Patent Literature 1 (WO2013/118561) discloses that an LDH separator is provided between a positive electrode and a negative electrode in a nickel-zinc secondary battery. Moreover, Patent Literature 2 (WO2016/076047) discloses a separator structure including an LDH separator fitted or joined to a resin outer frame, and discloses that the LDH separator has a high denseness to the degree that it has a gas impermeability and/or a water impermeability. Moreover, this literature also discloses that the LDH separator can be composited with porous substrate. Patent Literature 3 (WO2016/067884) discloses various methods for forming an LDH dense membrane on a surface of a porous substrate to obtain a composite material (LDH separator). This method comprises steps of uniformly adhering a starting material that can impart a starting point for LDH crystal growth to a porous substrate and subjecting the porous substrate to hydrothermal treatment in an aqueous solution of raw materials to form an LDH dense membrane on the surface of the porous substrate.

An LDH separator that achieved further densification by roll-pressing an LDH/porous substrate composite made via hydrothermal treatment, has also been proposed. For example, Patent Literature 4 (WO2019/124270) discloses an LDH separator that includes a polymer porous substrate and an LDH filling up the porous substrate and has a linear transmittance at a wavelength of 1,000 nm of 1% or more. This LDH separator is so dense that pores of the porous substrate are sufficiently filled up with LDH to become translucent, thereby making it possible to inhibit short circuits due to zinc dendrite further effectively. Moreover, Patent Literature 5 (WO2019/124212) discloses an LDH separator that includes a polymer porous substrate and an LDH filling up the porous substrate and has an average porosity of 0.03% or more and less than 1.0%.

CITATION LIST

Patent Literature

Patent Literature 1: WO2013/118561
Patent Literature 2: WO2016/076047
Patent Literature 3: WO2016/067884
Patent Literature 4: WO2019/124270
Patent Literature 5: WO2019/124212

SUMMARY OF THE INVENTION

When a zinc secondary battery such as a nickel-zinc battery is constituted by using the LDH separator which is highly densified as described above, a short circuit and the like due to zinc dendrites can be prevented to some extent. However, the LDH separator allows hydroxide ions to selectively pass the LDH separator by exclusively utilizing hydroxide-ion conductivity of a hydroxide ion-conductive layered compound such as LDH, and thus further improvements in ionic conductivity as well as denseness are desired.

The inventors have recently found that an LDH separator comprising a hydroxide ion-conductive layered compound that is an LDH and/or an LDH-like compound, which has a proportion of the hydroxide ion-conductive layered compound in the LDH separator of 25 to 85% by weight, can achieve both denseness and ionic conductivity.

Therefore, an object of the present invention is to provide an LDH separator of which both denseness and ionic conductivity are desirably achieved.

According to an aspect of the present invention, there is provided an LDH separator comprising a porous substrate and a hydroxide ion-conductive layered compound that is a layered double hydroxide (LDH) and/or a layered double hydroxide (LDH)-like compound, filling up pores of the porous substrate, wherein a proportion of the hydroxide ion-conductive layered compound in the LDH separator is 25 to 85% by weight According to another aspect of the present invention, there is provided a zinc secondary battery comprising the LDH separator.

According to another aspect of the present invention, there is provided a solid alkaline fuel cell comprising the LDH separator.

DETAILED DESCRIPTION OF THE INVENTION

LDH Separator

Figure 1A:
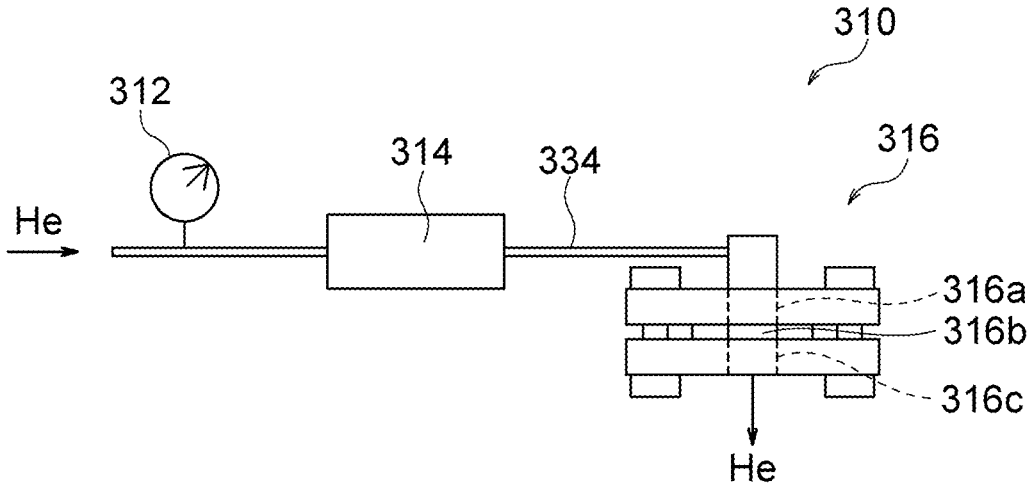
FIG. 1A is a conceptual view illustrating an example of a He permeability measurement system used in Examples A1 to E5.

The LDH separator of the present invention comprises a porous substrate and a hydroxide ion-conductive layered compound that fills up pores of the porous substrate. The hydroxide ion-conductive layered compound is a layered double hydroxide (LDH) and/or a layered double hydroxide (LDH)-like compound. The "LDH separator" as used herein is defined as a separator comprising an LDH and/or an LDH-like compound, which allows hydroxide ions to pass the separator by exclusively utilizing hydroxide-ion conductivity of LDH and/or the LDH-like compound. The "LDH-like compound" as used herein is a hydroxide and/or an oxide with a layered crystal structure which may not be called an LDH but is analogous to an LDH, and can be said to be an equivalent of LDH. However, it is also possible in a broader definition to comprehend that "LDH" includes not only an LDH but also an LDH-like compound. The LDH separator is a separator such that LDH and/or the LDH-like compound fill up pores of a porous substrate so as to exhibit hydroxide-ion conductivity and gas impermeability (and thus to function as an LDH separator exhibiting hydroxide-ion conductivity). For example, publicly known LDH separators, such as those disclosed in Patent Literatures 1 to 5, can be used. In any case, an LDH separator comprising a hydroxide ion-conductive layered compound that is LDH and/or the LDH-like compound, which has a proportion of the hydroxide ion-conductive layered compound in the LDH separator of 25 to 85% by weight, can desirably achieve both denseness and ionic conductivity.

The proportion of hydroxide ion-conductive layered compound in the LDH separator is 25 to 85% by weight, preferably 30 to 85% by weight, more preferably 35 to 85% by weight, and still more preferably 40 to 85% by weight. Within these ranges, both denseness and ionic conductivity of the LDH separator can be achieved more effectively. In particular, when the proportion of hydroxide ion-conductive layered compound is in a range more than 85% by weight, the ionic conductivity is significantly reduced, however, the present invention can achieve high ionic conductivity. Here, the proportion of hydroxide ion-conductive layered compound in the LDH separator is a value calculated by [Wh/(Wh+Wp)]×100 where the weight of the hydroxide ion-conductive layered compound is Wh and the weight of the porous substrate is Wp.

For example, the LDH separator preferably has ionic conductivity of 1.0 mS/cm or more, more preferably 1.5 mS/cm or more, still more preferably 2.0 mS/cm or more, and particularly preferably 2.5 mS/cm or more. The higher the ionic conductivity, the more desirable it is, thereby the upper limit thereof is not limited, but is, for example, 10 mS/cm.

The denseness of the LDH separator, on the other hand, can be evaluated by He permeability. More specifically, the LDH separator preferably has He permeability per unit area of 10 cm/min·atm or less, more preferably 5.0 cm/min atm or less, and still more preferably 1.0 cm/min·atm or less. The LDH separator with He permeability within such ranges can be said to have extremely high denseness. Therefore, a separator having a He permeability of 10 cm/min·atm or less can block passage of substances other than hydroxide ions at a high level. For example, in the case of a zinc secondary battery, permeation of Zn (typically permeation of zinc ions or zincate ions) in an electrolytic solution can be inhibited extremely effectively. The He permeability is measured via a step of supplying He gas to one surface of a separator to allow it to permeate the He gas, and a step of calculating a He permeability and evaluating a denseness of the hydroxide-ion conductive separator. The He permeability is calculated by the formula of F/(P×S) using a permeation amount F of He gas per unit time, a differential pressure P applied to a separator when the He gas permeates, and a membrane area S through which the He gas permeates. By evaluating the gas permeability using the He gas in such a manner, it is possible to evaluate denseness (dense or sparse) at an extremely high level, and as a result, it is possible to effectively evaluate a high denseness such that substances other than hydroxide ions (particularly Zn bringing about zinc dendrite growth) are not allowed to be permeated as much as possible (only a trace amount is permeated). This is because He gas has the smallest constituent unit among a wide variety of atomic and molecular species that can compose a gas, and has extremely low reactivity. Namely, a single He atom composes He gas without forming a molecule. In this respect, since a hydrogen gas is composed of $H_2$ molecules, the single He atom is smaller as a gas constituent unit. In the first place, $H_2$ gas is dangerous because it is a flammable gas. Then, by adopting an index of the He gas permeability defined by the above formula, it is possible to easily conduct objective evaluation relating to the denseness regardless of differences in various sample sizes and measurement conditions. Thus, it is possible to easily, safely, and effectively evaluate whether or not the separator has a sufficiently high denseness suitable for a separator for zinc secondary batteries. The measurement of the He permeability can preferably be conducted according to the procedure described in Evaluation 5 in Examples described below.

As described above, the LDH separator comprises a porous substrate and an LDH and/or an LDH-like compound (hereinafter referred to as a hydroxide ion-conductive layered compound). The hydroxide ion-conductive layered compound is connected between the upper surface and the lower surface of the LDH separator, thereby ensuring hydroxide ion-conductivity of the LDH separator. In the LDH separator, the hydroxide ion-conductive layered compound fills up pores of the porous substrate, however, the pores of the porous substrate are not necessarily completely filled up, and residual pores may be slightly present.

LDH is composed of a plurality of hydroxide base layers and interlayers interposed therebetween. The hydroxide base layer is composed mainly of a metallic element (typically a metal ion) and OH groups. The interlayers of LDH are composed of anions and $H_2O$. The anion is a monovalent or higher anion, preferably a monovalent or divalent ion. An anion in LDH preferably contains $OH^-$ and/or $CO_3^{2-}$. LDH also has excellent ionic conductivity due to its inherent properties. In general, LDH has been known to be represented by the basic compositional formula $M^{2+}_{1-x}M^{3+}_x(OH)_2A^{n-}_{x/n} \cdot mH_2O$ where $M^{2+}$ is a divalent cation and $M^{3+}$ is a trivalent cation, $A^{n-}$ is an n-valent anion, n is an integer of 1 or greater, x is 0.1 to 0.4, and m is 0 or greater. In the above basic compositional formula, $M^{2+}$ can be any divalent cation, but examples thereof preferably include $Mg^{2+}$, $Ca^{2+}$, and $Zn^{2+}$ and more preferably $Mg^{2+}$. $M^{3+}$ can be any trivalent cation, but examples thereof include preferably $Al^{3+}$ or $Cr^{3+}$ and more preferably $Al^{3+}$. $A^{n-}$ can be any anion, however, preferred examples thereof include $OH^-$ and/or $CO_3^{2-}$. Therefore, in the above basic compositional formula, $M^{2+}$ preferably contains $Mg^{2+}$, $M^{3+}$ preferably contains $Al^{3+}$, and $A^{n-}$ preferably contains $OH^-$ and/or $CO_3^{2-}$. n is an integer of 1 or greater, but preferably 1 or 2. x is 0.1 to 0.4, but preferably 0.2 to 0.35. m is an arbitrary numeral denoting the number of moles of water, and is 0 or greater, typically a real number greater than 0 or 1 or greater. However, the above basic compositional formula is only the "basic compositional" formula that is representatively exemplified for LDH, and the constituent ions can be appropriately replaced. For example, in the above basic compositional formula, some or all of $M^{3+}$ may be replaced with a tetravalent cation or a cation with higher valence (for example, $Ti^{4+}$), in which case a coefficient x/n of anion $A^{n-}$ in the above formula may be changed as appropriate.

For example, the hydroxide base layer of LDH containing Mg, Al, Ti and OH groups is particularly preferred in terms of exhibiting excellent alkali resistance. In this case, the hydroxide base layer may contain other elements or ions as long as it contains Mg, Al, Ti, and OH groups. For example, the LDH or hydroxide base layer may comprise Y and/or Zn. Moreover, when Y and/or Zn is contained in the LDH or hydroxide base layer, Al or Ti may not be contained in the LDH or hydroxide base layer. However, the hydroxide base layer preferably comprises Mg, Al, Ti, and OH groups as major components. Namely, the hydroxide base layer is preferably mainly composed of Mg, Al, Ti, and OH groups. Therefore, the hydroxide base layer is typically composed of Mg, Al, Ti, OH groups and, in some cases, unavoidable impurities. The atomic ratio of Ti/Al in the LDH is preferably 0.5 to 12 and more preferably 1.0 to 12, as determined by energy dispersive X-ray spectroscopy (EDS). Within the above range, the effect of inhibiting a short circuit caused by zinc dendrites (i.e., dendrite resistance) can be more effectively realized without impairing an ionic conductivity. For the same reason, the atomic ratio of Ti/(Mg+Ti+Al) in the LDH, as determined by energy dispersive X-ray spectroscopy (EDS), is preferably 0.1 to 0.7 and more preferably 0.2 to 0.7. Moreover, the atomic ratio of Al/(Mg+Ti+Al) in the LDH is preferably 0.05 to 0.4 and more preferably 0.05 to 0.25. Further, the atomic ratio of Mg/(Mg+Ti+Al) in the LDH is preferably 0.2 to 0.7 and more preferably 0.2 to 0.6. The EDS analysis is preferably carried out with an EDS analyzer (for example, X-act manufactured by Oxford Instruments) by 1) capturing an image at an accelerating voltage of 20 kV and a magnification of 5,000 times, 2) carrying out a three-point analysis at about 5 μm intervals in a point analysis mode, 3) repeating the above 1) and 2) once more, and 4) calculating an average value of a total of 6 points.

Alternatively, the hydroxide base layer of LDH may contain Ni, Al, Ti and OH groups. In this case, the hydroxide base layer may contain other elements or ions as long as it contains Ni, Al, Ti, and OH groups. However, the hydroxide base layer preferably contains Ni, Al, Ti, and OH groups as major components. That is to say, the hydroxide base layer is preferably composed mainly of Ni, Al, Ti, and OH groups. The hydroxide base layer is therefore typically composed of Ni, Al, Ti, OH groups, and unavoidable impurities in case. An atomic ratio of Ti/(Ni+Ti+Al) in the LDH, as determined by energy dispersive X-ray analysis (EDS), is preferably 0.10 to 0.90, more preferably 0.20 to 0.80, still more preferably 0.25 to 0.70, and particularly preferably 0.30 to 0.61. The ratio within the above range can improve both alkali resistance and ionic conductivity. Thus, the hydroxide ion-conductive layered compound may contain not only an LDH but also Ti so much that titania is formed as by-product. That is to say, the hydroxide ion-conductive layered compound may further contain titania. The inclusion of titania is expected to increase hydrophilicity and improve wettability with an electrolytic solution (i.e., increase in conductivity).

The LDH-like compound is a hydroxide and/or an oxide with a layered crystal structure which may not be called an LDH but is analogous to an LDH, and the LDH-like compound preferably contains Mg and one or more elements containing at least Ti, selected from the group consisting of Ti, Y, and Al. Thus, using the LDH-like compound, which is a hydroxide and/or an oxide with a layered crystal structure containing at least Mg and Ti, as a hydroxide ion-conductive material, instead of a conventional LDH, can provide a hydroxide ion-conductive separator excellent in alkali resistance and is capable of even more effectively inhibiting short circuits due to by zinc dendrites. Therefore, a preferred LDH-like compound is a hydroxide and/or an oxide with a layered crystal structure, containing Mg and one or more elements containing at least Ti, selected from the group consisting of Ti, Y and Al. Thus, a typical LDH-like compound is a complex hydroxide and/or a complex oxide of Mg, Ti, optional Y, and optional Al, and is particularly preferably a complex hydroxide and/or a complex oxide of Mg, Ti, Y and Al. The above elements may be replaced by other elements or ions to the extent that the basic properties of the LDH-like compound are not impaired; however, the LDH-like compound is preferably free of Ni.

The LDH-like compound can be identified by X-ray diffraction. Specifically, the LDH separator is such that, when it is subjected to X-ray diffraction on a surface thereof, a peak derived from the LDH-like compound typically in $5° \leq 2\theta \leq 10°$, more typically $7° \leq 2\theta \leq 10°$, is detected. As described above, LDH is a substance with an alternating stacked structure in which an exchangeable anion and $H_2O$ are present as interlayers between the stacked hydroxide base layers. In this respect, when an LDH is subjected to the measurement by the X-ray diffraction method, a peak derived from a crystal structure of an LDH (i.e., the (003) peak of LDH) is intrinsically detected at the position of $2\theta=11$ to $12°$. To the contrary, when an LDH-like compound is subjected to the measurement by the X-ray diffraction method, a peak is detected typically in the above-mentioned range, which is shifted to a lower angle side than the above peak position of the LDH. Using $2\theta$ corresponding to the peak derived from the LDH-like compound in the X-ray diffraction, it is possible to determine the interlayer distance of a layered crystal structure according to the Bragg's formula. The interlayer distance of the layered crystal structure constituting the LDH-like compound thus determined is typically 0.883 to 1.8 nm and more typically 0.883 to 1.3 nm.

An atomic ratio of Mg/(Mg+Ti+Y+Al) in the LDH-like compound, as determined by energy dispersive X-ray spectroscopy (EDS), is preferably 0.03 to 0.25 and more preferably 0.05 to 0.2. Moreover, an atomic ratio of Ti/(Mg+Ti+Y+Al) in the LDH-like compound is preferably 0.40 to 0.97 and more preferably 0.47 to 0.94. Furthermore, an atomic ratio of Y/(Mg+Ti+Y+Al) in the LDH-like compound is preferably 0 to 0.45 and more preferably 0 to 0.37. Then, an atomic ratio of Al/(Mg+Ti+Y+Al) in the LDH-like compound is preferably 0 to 0.05 and more preferably 0 to 0.03. The ratio within the above range renders alkali resistance more excellent and can more effectively achieve inhibition effect of short circuits due to zinc dendrites (i.e., dendrite resistance). By the way, LDH that has been conventionally known regarding an LDH separator can be represented by the general formula of a basic composition: $M^{2+}_{1-x}M^{3+}_x(OH)_2A^{n-}_{x/n} \cdot mH_2O$ where $M^{2+}$ is a divalent cation and $M^{3+}$ is a trivalent cation, $A^{n-}$ is an n-valent anion, n is an integer of 1 or greater, x is 0.1 to 0.4, and m is 0 or greater. On the other hand, the above atomic ratio in the LDH-like compound generally deviates from the atomic ratio in the above general formula of LDH. Therefore, the LDH-like compound can be generally said to have a composition ratio (atomic ratio) that is different from that of a conventional LDH. In this connection, the EDS analysis is preferably carried out with an EDS analyzer (for example, X-act manufactured by Oxford Instruments) by 1) capturing an image at an accelerating voltage of 20 kV and a magnification of 5,000 times, 2) carrying out a three-point analysis at about 5 $\mu$m intervals in a point analysis mode, 3) repeating the above 1) and 2) once more, and 4) calculating an average value of a total of 6 points.

The LDH separator isolates a positive electrode plate and a negative electrode plate so as to be hydroxide-ion conductive when incorporated in a zinc secondary battery. The preferred LDH separator has a gas impermeability and/or a water impermeability. In other words, the LDH separator is preferably densified to such an extent that it has a gas impermeability and/or a water impermeability. Incidentally, as described in Patent Literatures 2 and 3 and used herein, "having a gas impermeability" means that even if helium gas is brought into contact with one side of an object to be measured in water at a differential pressure of 0.5 atm, generation of bubbles due to helium gas is not observed from another side. Moreover, as described in Patent Literatures 2 and 3 and used herein, "having a water impermeability" refers to allowing no permeation of water in contact with one side of an object to be measured to another side. Namely, the LDH separator having a gas impermeability and/or a water impermeability refers to the LDH separator having a high denseness to the degree that it does not allow a gas or water to pass through, and refers not to a porous film or other porous material that has a water permeability or a gas permeability. In such a manner, the LDH separator selectively allows only hydroxide ions to pass through due to its hydroxide-ion conductivity, and can exhibit a function as a battery separator. Therefore, the composition thereof is extremely effective in physically blocking penetration of the separator by the zinc dendrites generated upon charge to prevent a short circuit between the positive and negative electrodes. Since the LDH separator has a hydroxide-ion conductivity, it enables efficient movement of necessary hydroxide ions between the positive electrode plate and the negative electrode plate, and can realize a charge/discharge reaction in the positive electrode plate and the negative electrode plate.

As described above, the LDH separator comprises the hydroxide ion-conductive layered compound and the porous substrate (typically composed of the porous substrate and the hydroxide ion-conductive layered compound), and is a separator such that the hydroxide ion-conductive layered compound fills up pores of the porous substrate so as to exhibit hydroxide-ion conductivity and gas impermeability (and thus to function as a separator exhibiting hydroxide-ion conductivity). The hydroxide ion-conductive layered compound is particularly preferably incorporated over the entire region of the porous substrate in the thickness direction thereof. The thickness of the LDH separator is preferably 3 to 80 $\mu$m, more preferably 3 to 60 $\mu$m, and even more preferably 3 to 40 $\mu$m.

The porous substrate is preferably composed of a polymer material. The polymer porous substrate has advantages of 1) flexibility (hence, it is hard to break even if being thin.), 2) facilitation of increase in porosity, 3) facilitation of increase in a conductivity (because it can be rendered thin while increasing porosity.), and 4) facilitation of manufacture and handling. Moreover, by taking advantage of the flexibility of 1) above, it also has 5) an advantage of capable of easily bending or jointing by sealing, a hydroxide-ion conductive separator comprising a porous substrate made of a polymer material. The polymer material preferably includes, for example, polystyrene, polyether sulfone, polypropylene, an epoxy resin, polyphenylene sulfide, a fluororesin (tetrafluororesin: PTFE, etc.), cellulose, nylon, polyethylene, and any combination thereof. More preferably, from the viewpoint of a thermoplastic resin suitable for heat pressing, it includes polystyrene, polyether sulfone, polypropylene, epoxy resin, polyphenylene sulfide, a fluororesin (tetrafluororesin: PTFE, etc.), nylon, polyethylene, any combination thereof, etc. All of the various preferred materials described above have alkali resistance as resistance to an electrolytic solution of a battery. The polymer materials are particularly preferably polyolefins such as polypropylene and polyethylene, and most preferably polypropylene or polyethylene, in terms of excellent hydrothermal resistance, acid resistance, and alkali resistance as well as low cost. The hydroxide ion-conductive layered compound is particularly preferably incorporated over the entire region of the polymer porous substrate in the thickness direction thereof (for example, the hydroxide ion-conductive layered compound fills up most or almost all pores inside the polymer porous substrate.). As such a polymer porous substrate, a commercially available polymer microporous membrane can preferably be used.

The method for producing the LDH separator is not particularly limited, and it is fabricated directly or by appropriately changing the various conditions (in particular a LDH raw material composition) in methods for producing already known LDH separators (or LDH-containing functional layers and composite materials) (see, for example, Patent Literatures 1 to 5). For example, the LDH separator can be produced by (1) preparing a porous substrate, (2) coating a porous substrate with (i) a mixed sol of alumina and titania (in the case of forming an LDH) or (ii) a solution comprising a titania sol (or further a yttrium sol and/or an alumina sol) (in the case of forming an LDH-like compound), and drying the mixture to form a titania-containing layer, (3) immersing the porous substrate in a raw material aqueous solution comprising magnesium ions ($Mg^{2+}$) and urea (or further yttrium ions ($Y^{3+}$)), and (4) hydrothermally treating the porous substrate in the raw material aqueous solution, and forming a hydroxide ion-conductive layered compound on the porous substrate and/or in the porous substrate. Moreover, it is conjectured that the presence of urea in the above step (3) generates ammonia in the solution by utilizing hydrolysis of urea and raises a pH value, and the coexisting metal ions form a hydroxide and/or an oxide, making it possible to obtain a hydroxide ion-conductive layered compound (i.e., an LDH and/or an LDH-like compound). Moreover, since hydrolysis is accompanied by generation of carbon dioxide, when an LDH is formed, the LDH having an anion of carbonate ion type can be obtained.

In particular, in the case of fabricating an LDH separator in which the hydroxide ion-conductive layered compound is incorporated over the entire region of the polymer porous substrate in the thickness direction thereof, it is preferred to coat the substrate with the mixed sol solution in the above (2) in such a procedure as to permeate the mixed sol solution into the whole or most of the inside of the substrate, which thereby makes it possible to finally fill most or almost all pores inside the porous substrate with the hydroxide ion-conductive layered compound. The coating method preferably includes, for example, a dip coating and a filtration coating, and the dip coating is particularly preferred. The amount of the mixed sol solution adhered can be adjusted by adjusting the number of times of coating in the dip coating, etc. After the substrate coated with the mixed sol solution by the dip coating, etc., was dried, the above steps (3) and (4) may be carried out.

The LDH separator obtained by the above method or the like may be subjected to pressing treatment. Thereby an LDH separator excellent in a higher denseness can be obtained. The pressing method may be, for example, roll pressing, uniaxial pressing, or CI P (cold isostatic pressing), and it is not particularly limited, but is preferably roll pressing. This pressing with heating softens the polymer porous substrate, thereby enabling the hydroxide ion-conductive layered compound to sufficiently fill up pores of the polymer porous substrate, which is preferred. For sufficient softening, for example, in the case of polypropylene or polyethylene, it is preferred to heat the polymer at 60 to 200° C. Pressing such as roll pressing in such a temperature range can significantly reduce the residual pores of the LDH separator. As a result, the LDH separator can be extremely highly densified and therefore short circuits caused by zinc dendrites can be inhibited even more effectively. In roll pressing, morphology of residual pores can be controlled by appropriately adjusting a roll gap and a roll temperature, whereby an LDH separator having a desired denseness can be obtained.

Zinc Secondary Battery

The LDH separator of the present invention is preferably applied to a zinc secondary battery. Therefore, according to a preferred aspect of the present invention, a zinc secondary battery comprising an LDH separator is provided. A typical zinc secondary battery comprises a positive electrode, a negative electrode, and an electrolytic solution, and the positive electrode and the negative electrode are separated from each other with an LDH separator interposed therebetween. The zinc secondary battery of the present invention is not particularly limited provided that it is a secondary battery in which zinc is used as a negative electrode and an electrolytic solution (typically an alkali metal hydroxide aqueous solution) is used. Therefore, it can be a nickel-zinc secondary battery, a silver oxide-zinc secondary battery, a manganese oxide-zinc secondary battery, a zinc-air secondary battery, or various other alkaline-zinc secondary batteries. For example, a positive electrode preferably comprises nickel hydroxide and/or nickel oxyhydroxide whereby the zinc secondary battery forms a nickel-zinc secondary battery. Alternatively, the positive electrode may be an air electrode whereby the zinc secondary battery forms a zinc-air secondary battery.

Solid Alkaline Fuel Cell

The LDH separator of the present invention can also be applied to a solid alkaline fuel cell. Namely, by using the LDH separator in which pores of the porous substrate are filled up with the LDH and highly densified, the solid alkaline fuel cell can be provided, which is capable of effectively inhibiting reduction of an electromotive force due to permeation of a fuel to an air electrode side (for example, crossover of methanol). This is because the permeation of the fuel such as methanol to the LDH separator can be effectively inhibited while exhibiting the hydroxide-ion conductivity of the LDH separator. Therefore, according to another preferred aspect of the present invention, a solid alkaline fuel cell comprising the LDH separator is provided. A typical solid alkaline fuel cell according to the aspect includes an air electrode to which oxygen is supplied, a fuel electrode to which a liquid fuel and/or a gaseous fuel are supplied, and an LDH separator interposed between the fuel electrode and the air electrode.

Other Batteries

The LDH separator of the present invention can be used not only for nickel-zinc batteries and solid alkaline fuel cells, but also for nickel-hydrogen batteries, for example. In this case, the LDH separator functions to block the nitride shuttle (movement of nitric acid groups between electrodes), which is a factor of self-discharge of the battery. Moreover, the LDH separator of the present invention can also be used for a lithium battery (a battery having a negative electrode made of lithium metal), a lithium ion battery (a battery having a negative electrode made of carbon, etc.), or a lithium-air battery, etc.

EXAMPLES

Examples of LDH separators fabricated, comprising the hydroxide ion-conductive layered compound (LDH or the LDH-like compound) will be described below. The evaluation methods of the LDH separators will be described as follows.

Evaluation 1: Observation of Microstructure

A surface microstructure of an LDH separator was observed by using a scanning electron microscope (SEM, JSM-6610LV, manufactured by JEOL Ltd.) at an accelerating voltage of 10 to 20 kV.

Evaluation 2: Elemental Analysis Evaluation (EDS)

Composition analysis was carried out on a surface of an LDH separator by using an EDS analyzer (apparatus name: X-act, manufactured by Oxford Instruments) to confirm incorporation of prescribed elements in crystals and to calculate an atomic ratio of the prescribed elements. This analysis was carried out by 1) capturing an image at an accelerating voltage of 20 kV and a magnification of 5,000 times, 2) carrying out a three-point analysis at about 5 μm intervals in a point analysis mode, and 3) repeating the above 1) and 2) once more.

Evaluation 3: Identification of Hydroxide Ion-Conductive Layered Compound

An XRD profile was obtained by measuring a crystal phase of the hydroxide ion-conductive layered compound with an X-ray diffractometer (RINT TTR III manufactured by Rigaku Corporation) under the measurement conditions of voltage: 50 kV, current value: 300 mA, and measurement range: 10 to 70°.

Evaluation 4: Proportion of Hydroxide Ion-Conductive Layered Compound in LDH Separator The weight of the hydroxide ion-conductive layered compound was calculated by measuring the weight of an LDH separator and subtracting the weight of a single porous substrate from the measured weight. The proportion of the hydroxide ion-conductive layered compound in the LDH separator was calculated by dividing the obtained weight of the hydroxide ion-conductive layered compound by the weight of the LDH separator and multiplying by 100.

Evaluation 5: He Permeation Measurement

Figure 1B:
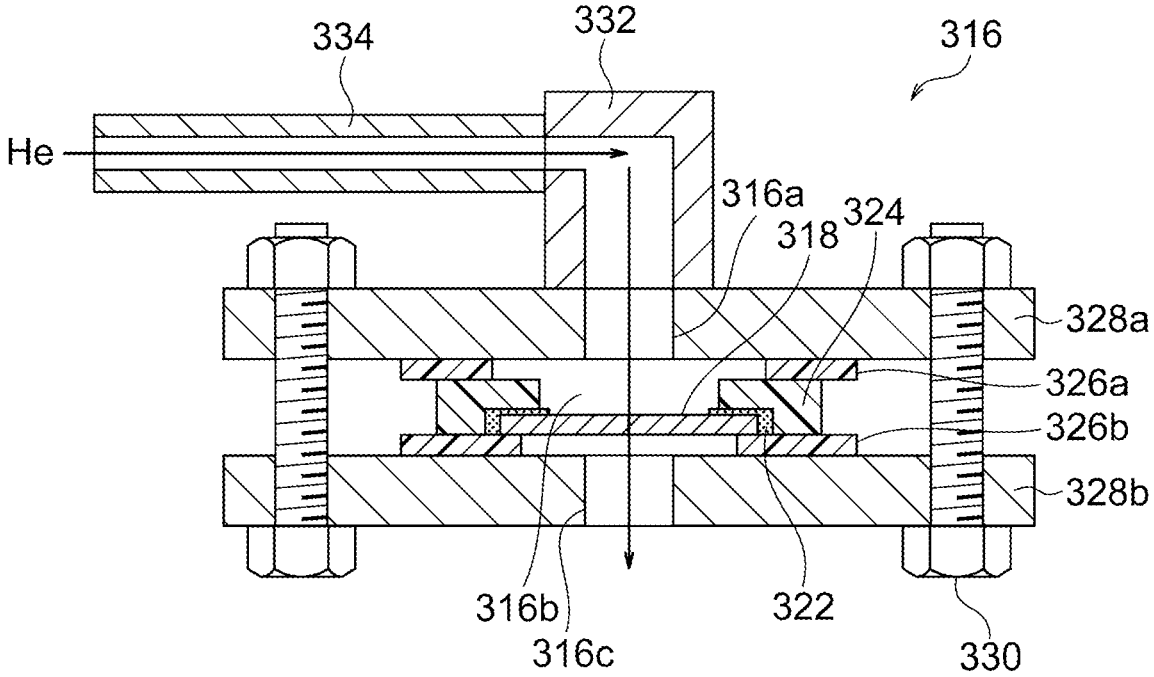
FIG. 1B is a schematic cross-sectional view of the sample holder used in the measurement system shown in FIG. 1A and the peripheral composition thereof.

From the viewpoint of a He permeability, a He permeation test was carried out as follows in order to evaluate a denseness of an LDH separator. First, the He permeability measurement system 310 shown in FIG. 1A and FIG. 1B was build up. The He permeability measurement system 310 was constituted so that He gas from a gas cylinder filled with the He gas was supplied to a sample holder 316 via a pressure gauge 312 and a flow meter 314 (digital flow meter), and it was permeated from one surface of an LDH separator 318 held in the sample holder 316 to the other surface and discharged.

The sample holder 316 has a structure including a gas supply port 316a, a closed space 316b, and a gas discharge port 316c, and was assembled as follows. First, an adhesive 322 was applied along an outer circumference of the LDH separator 318 and attached to a jig 324 (made of an ABS resin) having an opening in the center. A packing made of butyl rubber was arranged as sealing members 326a and 326b at the upper end and lower end of the jig 324, and was further sandwiched by support members 328a and 328b (made of PTFE) having openings that were made from flanges, from the outside of the sealing members 326a and 326b. In this manner, the closed space 316b was partitioned by the LDH separator 318, the jig 324, the sealing member 326a, and the support member 328a. The support members 328a and 328b were firmly tightened to each other by a fastening means 330 using screws so that He gas did not leak from portions other than a gas discharge port 316c. A gas supply pipe 334 was connected to the gas supply port 316a of the sample holder 316 thus assembled via a joint 332.

Next, He gas was supplied to the He permeability measurement system 310 via the gas supply pipe 334, and was permeated through the LDH separator 318 held in the sample holder 316. At this time, a gas supply pressure and a flow rate were monitored by the pressure gauge 312 and the flow meter 314. After permeating the He gas for 1 to 30 minutes, a He permeability was calculated. The He permeability was calculated by the formula of $F/(P \times S)$ using a permeation amount $F$ ($cm^3/min$) of the He gas per unit time, a differential pressure $P$ (atm) applied to the LDH separator when the He gas permeates, and a membrane area $S$ ($cm^2$) through which the He gas permeates. The permeation amount $F$ ($cm^3/min$) of the He gas was read directly from the flow meter 314. Moreover, as the differential pressure $P$, a gauge pressure read from the pressure gauge 312 was used. The He gas was supplied so that the differential pressure $P$ was in the range of 0.05 to 0.90 atm.

Evaluation 6: Measurement of Ionic Conductivity

Figure 2:
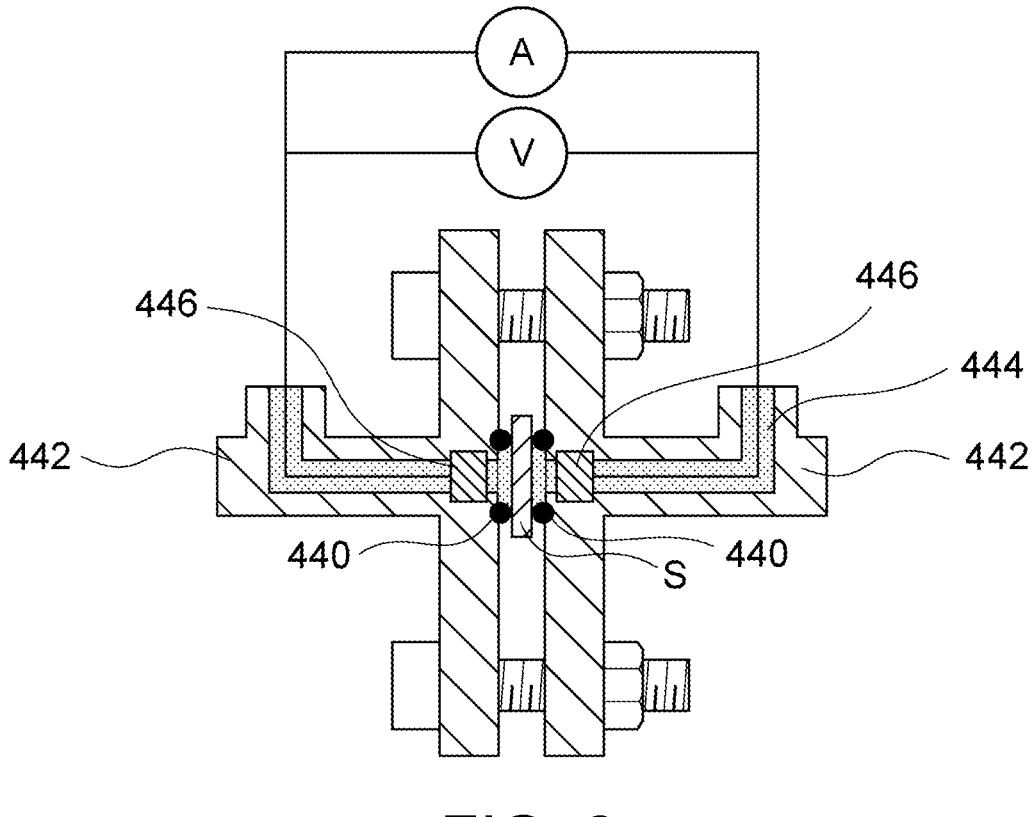
FIG. 2 is a schematic cross-sectional view of the electrochemical measurement system used in Examples A2 to E5.

A conductivity of an LDH separator in an electrolytic solution was measured as follows by using the electrochemical measurement system shown in FIG. 2. The LDH separator sample S was sandwiched with 1 mm thick silicone packings 440 from both sides of the sample and incorporated into a PTFE flange type cell 442 having an inner diameter of 6 mm. As an electrode 446, a nickel wire mesh of #100 mesh was incorporated into the cell 442 in a cylindrical fashion having a diameter of 6 mm, so that a distance between the electrodes was 2.2 mm. As an electrolytic solution 444, a 6 M KOH aqueous solution was filled in the cell 442. By using an electrochemical measurement system (potentio/galvanostat-frequency response analyzer manufactured by Solartron Analytical, type: 1287A and 1255B), measurement was carried out under the conditions of a frequency range of 1 MHz to 0.1 Hz and an applied voltage of 10 mV, and an intercept of a real number axis was used as a resistance of the complex material sample S. The same measurement as above was carried out without the LDH separator sample S, and a blank resistance was also determined. The difference between the resistance of the LDH separator sample S and the blank resistance was defined as a resistance of the LDH separator. The conductivity was determined by using the resistance of the obtained LDH separator and a thickness and an area of the LDH separator.

Examples A1-A7

LDH separators comprising an Mg—Ti-LDH-like compound were fabricated and evaluated as follows.

(1) Preparation of Polymer Porous Substrate

A commercially available polyethylene microporous membrane having a porosity of 50%, an average pore diameter of 0.1 µm, and a thickness of 10 µm was prepared as a polymer porous substrate and cut out to a size of 5.0 cm×5.0 cm.

(2) Titania Sol Coating on Polymer Porous Substrate

The substrate prepared in (1) above was coated with a titania sol solution (AM-15, manufactured by Taki Chemical Co., Ltd.) by dip coating. The dip solution was prepared by mixing a titania sol and ion-exchanged water at the weight ratio shown in Table 1. The dip coating was carried out by immersing the substrate in 100 ml of the dip solution followed by carrying out a procedure of pulling it up vertically the number of times shown in Table 1, and then drying the dip coated substrate at room temperature for 1 hour.

(3) Preparation of Raw Material Aqueous Solution

Magnesium nitrate hexahydrate ($Mg(NO_3)_2.6H_2O$, manufactured by Kanto Chemical Co., Inc.) and urea (($NH_2)_2CO$, manufactured by Sigma-Aldrich Co. LLC) were prepared as raw materials. The raw materials were weighed so that the magnesium nitrate hexahydrate was 0.0075 mol/L and urea/$NO_3^-$ (molar ratio)=96 and placed in a beaker, and ion-exchanged water was added thereto to have a total volume of 80 ml. Thereafter the mixture was stirred to obtain a raw material aqueous solution.

(4) Membrane Formation by Hydrothermal Treatment

Both the raw material aqueous solution and the dip-coated substrate were sealed in a Teflon® airtight container (autoclave container having a content of 100 ml and an outer side jacket made of stainless steel). At this time, a substrate was fixed while being floated from the bottom of the Teflon® airtight container, and installed vertically so that the solution was in contact with both sides of the substrate. Thereafter, an LDH-like compound was formed on the surface and the inside of the substrate by subjecting it to hydrothermal treatment at a hydrothermal temperature of 90° C. for 10 hours. With an elapse of the predetermined time, the substrate was taken out from the airtight container, washed with ion-exchanged water, and dried at room temperature over night to form an LDH-like compound inside pores of the porous substrate. Thus, an LDH separator was obtained.

(5) Densification by Roll Pressing

The LDH separator was sandwiched between a pair of PET films (Lumiler® manufactured by Toray Industries, Inc., thickness of 40 µm), and roll-pressed at a roll rotation speed of 3 mm/s, a roller heating temperature of 70° C., and a roll gap of 70 µm to obtain a further densified LDH separator.

(6) Various Evaluations

The obtained LDH separators underwent evaluations 1 to 6. Note, however, Evaluation 6 was not conducted for Example A1 because desired denseness was not observed in Evaluation 5. The results were as follows.

Evaluation 1: Multiple platy crystals characteristic of LDH were confirmed.

Evaluation 2: As a result of EDS elemental analysis, Mg and Ti that were constituent elements of the LDH-like compound, were detected. That is to say, these elements were confirmed to be incorporated and crystallized as a hydroxide ion-conductive layered compound.

Evaluation 3: In an XRD profile, a peak derived from the LDH-like compound was detected in the range of $5° \le 2\theta \le 10°$. Since the (003) peak position of LDH is usually observed at $2\theta=11$ to 12°, the above peak is considered to be a peak such that the (003) peak of LDH was shifted to the lower angle side, which therefore indicates that the above peak is derived from a compound that is analogous to an LDH although cannot be called LDH (i.e., an LDH-like compound).

Evaluation 4: The proportion of the hydroxide ion-conductive layered compound in the LDH separator was as shown in Table 2.

Evaluation 5: As shown in Table 2, the extremely high denseness such as He permeability of 0.00 cm/min·atm was confirmed, except for example A1 (Comparative Example).

Evaluation 6: As shown in Table 2, the higher ionic conductivity was confirmed in Examples A3 to A7 than that in Example A2 (Comparative Example). As shown in Table 2, the ionic conductivity increased (i.e., performance was improved) as increasing the weight of the hydroxide ion-conductive layered compound, however, such a tendency was observed that the ionic conductivity reached a peak in the vicinity of Example A5 (proportion of the hydroxide ion-conductive layered compound: 62% by weight) and subsequently the ionic conductivity reduced as increasing the weight of the hydroxide ion-conductive layered compound.

(1) Preparation of Polymer Porous Substrate

A commercially available polyethylene microporous membrane having a porosity of 50%, an average pore diameter of 0.1 μm, and a thickness of 10 μm, was prepared as the polymer porous substrate, and cut to a size of 5.0 cm×5.0 cm.

(2) Titania Yttria Sol Coating on Polymer Porous Substrate

The substrate prepared in (1) above was coated with a titania sol solution (AM-15, manufactured by Taki Chemical Co., Ltd.) and an yttria sol by dip coating. The dip solution was prepared by mixing the titania sol solution and the yttria sol at Ti/Y (molar ratio)=4 and followed by mixing ion-exchanged water in the weight ratio shown in Table 3 with respect to the mixed sol. The dip coating was carried out by immersing the substrate in 100 ml of the dip solution followed by carrying out a procedure of pulling it up

TABLE 1

| Mg—Ti | Weight ratio of dip solution | | Number of times of dipping | Concentration of raw material aqueous solution | | Hydrothermal conditions | |
| | Titania sol | Ion-exchanged water | | Magnesium nitrate hexahydrate x (mol/L) | Urea/NO$_3^-$ (molar ratio) = y | Hydrothermal temperature (° C.) | Hydrothermal time (h) |
|---|---|---|---|---|---|---|---|
| Example A1* | 1 | 10 | 1 | 0.0075 | 96 | 90 | 10 |
| Example A2* | 1 | 5 | 1 | 0.0075 | 96 | 90 | 10 |
| Example A3 | 1 | 1 | 1 | 0.0075 | 96 | 90 | 10 |
| Example A4 | 1 | 0 (no addition) | 1 | 0.0075 | 96 | 90 | 10 |
| Example A5 | 1 | 0 (no addition) | 1 | 0.0075 | 96 | 90 | 10 |
| Example A6 | 1 | 0 (no addition) | 2 | 0.0075 | 96 | 90 | 10 |
| Example A7 | 1 | 0 (no addition) | 3 | 0.0075 | 96 | 90 | 10 |

*denotes a Comparative Example.

TABLE 2

| Mg-Ti | Proportion of hydroxide ion-conductive layered compound in LDH separator (% by weight) | He permeability (cm/min · atm) | Ionic conductivity (mS/cm) |
|---|---|---|---|
| Example A1* | 8 | 23.6 | Not measured |
| Example A2* | 18 | 0.00 | 0.15 |
| Example A3 | 32 | 0.00 | 1.63 |
| Example A4 | 42 | 0.00 | 3.21 |
| Example A5 | 62 | 0.00 | 3.54 |
| Example A6 | 69 | 0.00 | 3.32 |
| Example A7 | 82 | 0.00 | 2.66 |

*denotes a Comparative Example.

The results shown in Table 2 also find that the proportion of the hydroxide ion-conductive layered compound in the LDH separator in the range of 25 to 85% by weight can achieve both high denseness (for example, He permeability of 10 cm/min·atm or less) and high ionic conductivity (for example, 1 mS/cm or more).

Examples B1 to B5

LDH separators comprising a Mg—(Ti,Y)-LDH-like compound were fabricated and evaluated as follows.

vertically the number of times shown in Table 3. Thereafter, the dip coated substrate was dried at room temperature for 1 hour.

(3) Preparation of Raw Material Aqueous Solution

Magnesium nitrate hexahydrate (Mg(NO$_3$)$_2$·6H$_2$O, manufactured by Kanto Chemical Co., Inc.) and urea ((NH$_2$)$_2$CO, manufactured by Sigma-Aldrich Co. LLC) were prepared as raw materials. The raw materials were weighed so that the magnesium nitrate hexahydrate was 0.0075 mol/L and urea/NO$_3^-$ (molar ratio)=96 and placed in a beaker, and ion-exchanged water was added thereto to have a total volume of 80 ml. Thereafter the mixture was stirred to obtain a raw material aqueous solution.

(4) Membrane Formation by Hydrothermal Treatment

Both the raw material aqueous solution and the dip-coated substrate were sealed in a Teflon® airtight container (autoclave container having a content of 100 ml and an outer side jacket made of stainless steel). At this time, a substrate was fixed while being floated from the bottom of the Teflon® airtight container, and installed vertically so that the solution was in contact with both sides of the substrate. Thereafter, an LDH-like compound was formed on the surface and the inside of the substrate by subjecting it to hydrothermal treatment at a hydrothermal temperature of 120° C. for 16 hours. With an elapse of the predetermined time, the substrate was taken out from the airtight container, washed with ion-exchanged water, and dried at room temperature over night to form an LDH-like compound inside pores of the porous substrate. Thus, an LDH separator was obtained.

(5) Densification by Roll Pressing

The LDH separator was sandwiched between a pair of PET films (Lumiler® manufactured by Toray Industries, Inc., thickness of 40 μm), and roll-pressed at a roll rotation speed of 3 mm/s, a roller heating temperature of 70° C., and a roll gap of 70 μm to obtain a further densified LDH separator.

(6) Various Evaluations

The obtained LDH separators underwent evaluations 1 to 6. The results were as follows.

Evaluation 1: A large number of platy shapes peculiar to LDH were confirmed.

Evaluation 2: As a result of EDS elemental analysis, Mg, Ti and Y that were constituent elements of the LDH-like compound, were detected. That is to say, these elements were confirmed to be incorporated and crystallized as a hydroxide ion-conductive layered compound.

Evaluation 3: In an XRD profile, a peak derived from the LDH-like compound was detected in the range of $5°≤2θ≤10°$. Since the (003) peak position of LDH is usually observed at $2θ=11$ to $12°$, the above peak is considered to be a peak such that the (003) peak of LDH was shifted to the lower angle side, which therefore indicates that the above peak is derived from a compound that is analogous to an LDH although cannot be called LDH (i.e., LDH-like compound).

Evaluation 4: The proportion of the hydroxide ion-conductive layered compound in the LDH separator was as shown in Table 4.

Evaluation 5: As shown in Table 4, the extremely high denseness such as He permeability of 0.00 cm/min·atm was confirmed.

Evaluation 6: As shown in Table 4, the higher ionic conductivity was confirmed in Examples B2 to B5 than that in Example B1 (Comparative Example).

TABLE 4

| Mg-Ti, Y | Proportion of the hydroxide ion-conductive layered compound in LDH separator (% by weight) | He permeability (cm/min · atm) | Ionic conductivity (mS/cm) |
|---|---|---|---|
| Example B1* | 20 | 0.00 | 0.10 |
| Example B2 | 27 | 0.00 | 1.37 |
| Example B3 | 32 | 0.00 | 2.51 |
| Example B4 | 54 | 0.00 | 3.22 |
| Example B5 | 76 | 0.00 | 2.96 |

*denotes a Comparative Example.

Examples C1 to C5

LDH separators comprising a Mg—(Al, Ti)-LDH were fabricated and evaluated as follows.

(1) Preparation of Polymer Porous Substrate

A commercially available polyethylene microporous membrane having a porosity of 50%, an average pore diameter of 0.1 μm, and a thickness of 10 μm was prepared as a polymer porous substrate and cut out to a size of 5.0 cm×5.0 cm.

(2) Alumina·Titania Sol Coating on Polymer Porous Substrate

The substrate prepared in (1) above was coated with an amorphous alumina solution (Al-L7, manufactured by Taki Chemical Co., Ltd.) and a titania sol solution (AM-15, manufactured by Taki Chemical Co., Ltd.) by dip coating. The dip solution was prepared by mixing the amorphous alumina solution and the titania sol solution at Ti/Al (molar ratio)=2, and followed by mixing ion-exchanged water in the weight ratio shown in Table 5 with respect to the mixed solution. The dip coating was carried out by immersing the substrate in 100 ml of the dip solution followed by carrying out a procedure of pulling it up vertically the number of times shown in Table 5. Thereafter, the dip coated substrate was dried at room temperature for 1 hour.

(3) Preparation of Raw Material Aqueous Solution

Magnesium nitrate hexahydrate ($Mg(NO_3)_2·6H_2O$, manufactured by Kanto Chemical Co., Inc.) and urea (($NH_2)_2CO$, manufactured by Sigma-Aldrich Co. LLC) were prepared as

TABLE 3

| Mg—Ti, Y | Weight ratio of dip solution | | Number of times of dipping | Concentration of raw material aqueous solution | | Hydrothermal conditions | |
|---|---|---|---|---|---|---|---|
| | Ti/Y (molar ratio) | Ion-exchanged water | | Magnesium nitrate hexahydrate x (mol/L) | Urea/NO₃⁻ (molar ratio) = y | Hydrothermal temperature (° C.) | Hydrothermal time (h) |
| Example B1* | 4 | 10 | 1 | 0.0075 | 96 | 120 | 16 |
| Example B2 | 4 | 1 | 1 | 0.0075 | 96 | 120 | 16 |
| Example B3 | 4 | 0 (no addition) | 1 | 0.0075 | 96 | 120 | 16 |
| Example B4 | 4 | 0 (no addition) | 2 | 0.0075 | 96 | 120 | 16 |
| Example B5 | 4 | 0 (no addition) | 3 | 0.0075 | 96 | 120 | 16 |

*denotes a Comparative Example.

raw materials. The raw materials were weighed so that the magnesium nitrate hexahydrate was 0.015 mol/L and urea/NO$_3^-$ (molar ratio)=32 and placed in a beaker, and ion-exchanged water was added thereto to have a total volume of 80 ml. Thereafter the mixture was stirred to obtain a raw material aqueous solution.

(4) Membrane Formation by Hydrothermal Treatment

Both the raw material aqueous solution and the dip-coated substrate were sealed in a Teflon® airtight container (autoclave container having a content of 100 ml and an outer side Evaluation 4: The proportion of the hydroxide ion-conductive layered compound in the LDH separator was as shown in Table 6.

Evaluation 5: As shown in Table 6, the extremely high denseness such as He permeability of 0.0 cm/min·atm was confirmed.

Evaluation 6: As shown in Table 6, the higher ionic conductivity was confirmed in Examples C2 to C5 than that in Example C1.

TABLE 5

| Mg—Al, Ti | Weight ratio of dip solution | | Concentration of raw material aqueous solution | | | Hydrothermal conditions | |
| | Ti/Al (molar ratio) | Ion-exchanged water | Number of times of dipping | Magnesium nitrate hexahydrate x (mol/L) | Urea/NO$_3^-$ (molar ratio) = y | Hydrothermal temperature (° C.) | Hydrothermal time (h) |
|---|---|---|---|---|---|---|---|
| Example C1* | 2 | 5 | 1 | 0.015 | 32 | 90 | 16 |
| Example C2 | 2 | 1 | 1 | 0.015 | 32 | 90 | 16 |
| Example C3 | 2 | 0 (no addition) | 1 | 0.015 | 32 | 90 | 16 |
| Example C4 | 2 | 0 (no addition) | 2 | 0.015 | 32 | 90 | 16 |
| Example C5 | 2 | 0 (no addition) | 3 | 0.015 | 32 | 90 | 16 |

*denotes a Comparative Example.

jacket made of stainless steel). At this time, a substrate was fixed while being floated from the bottom of the Teflon® airtight container, and installed vertically so that the solution was in contact with both sides of the substrate. Thereafter, an LDH was formed on the surface and the inside of the substrate by subjecting it to hydrothermal treatment at a hydrothermal temperature of 120° C. for 16 hours. With an elapse of the predetermined time, the substrate was taken out from the airtight container, washed with ion-exchanged water, and dried at room temperature over night to form an LDH inside pores of the porous substrate. Thus, an LDH separator was obtained.

(5) Densification by Roll Pressing

The above LDH separator was sandwiched between a pair of PET films (Lumiler® manufactured by Toray Industries, Inc., thickness of 40 μm), and roll-pressed at a roll rotation speed of 3 mm/s, a roller heating temperature of 70° C., and a roll gap of 70 μm to obtain a further densified LDH separator.

(6) Various Evaluations

The obtained LDH separators underwent evaluations 1 to 6. The results were as follows.

Evaluation 1: Multiple platy crystals characteristic of LDH were confirmed.

Evaluation 2: As a result of EDS elemental analysis, Mg, Al and Ti that were constituent elements of LDH were detected. That is to say, these elements were confirmed to be incorporated and crystallized as a hydroxide ion-conductive layered compound.

Evaluation 3: In an XRD profile, a peak was detected in the vicinity of 2θ=11.5°, which was identified to be an LDH (hydrotalcites compound). The identification was carried out by using a diffraction peak of the LDH (hydrotalcites compound) described in JCPDS card No. 35-0964.

TABLE 6

| Mg-Al, Ti | Proportion of the hydroxide ion-conductive layered compound in LDH separator (% by weight) | He permeability (cm/min · atm) | Ionic conductivity (mS/cm) |
|---|---|---|---|
| Example C1* | 17 | 0.00 | 0.12 |
| Example C2 | 30 | 0.00 | 1.08 |
| Example C3 | 46 | 0.00 | 3.18 |
| Example C4 | 63 | 0.00 | 3.25 |
| Example C5 | 85 | 0.00 | 2.97 |

*denotes a Comparative Example.

Examples D1 to D5

LDH separators comprising a Mg—(Al,Ti,Y)-LDH-like compound were fabricated and evaluated as follows.

(1) Preparation of Polymer Porous Substrate

A commercially available polyethylene microporous membrane having a porosity of 50%, an average pore diameter of 0.1 μm, and a thickness of 10 μm was prepared as a polymer porous substrate and cut out to a size of 5.0 cm×5.0 cm.

(2) Alumina•Titania•Yttria Sol Coating on Polymer Porous Substrate

The substrate prepared in (1) above was coated with an amorphous alumina solution (Al-L7, manufactured by Taki Chemical Co., Ltd.), a titania solution (AM-15, manufactured by Taki Chemical Co., Ltd.) and an yttria sol by dip coating. The dip solution was prepared by mixing the amorphous alumina solution, the titania solution and the yttria sol at Ti/(Y+Al) (molar ratio)=2 and Y/Al (molar ratio)=8, and followed by mixing ion-exchanged water in the weight ratio shown in Table 7 with respect to the mixed solution with the sol. The dip coating was carried out by immersing the substrate in 100 ml of the dip solution followed by carrying out a procedure of pulling it up vertically the number of times shown in Table 7. Thereafter, the dip coated substrate was dried at room temperature for 1 hour.

(3) Preparation of Raw Material Aqueous Solution

Magnesium nitrate hexahydrate ($Mg(NO_3)_2 \cdot 6H_2O$, manufactured by Kanto Chemical Co., Inc.) and urea (($NH_2)_2CO$, manufactured by Sigma-Aldrich Co. LLC) were prepared as raw materials. The raw materials were weighed so that the magnesium nitrate hexahydrate was 0.0075 mol/L and urea/$NO_3^-$ (molar ratio)=96 and placed in a beaker, and ion-exchanged water was added thereto to have a total volume of 80 ml. Thereafter the mixture was stirred to obtain a raw material aqueous solution.

(4) Membrane Formation by Hydrothermal Treatment

Both the raw material aqueous solution and the dip-coated substrate were sealed in a Teflon® airtight container (autoclave container having a content of 100 ml and an outer side jacket made of stainless steel). At this time, a substrate was fixed while being floated from the bottom of the Teflon® airtight container, and installed vertically so that the solution LDH-like compound, were detected. That is to say, these elements were confirmed to be incorporated and crystallized as a hydroxide ion-conductive layered compound.

Evaluation 3: In an XRD profile, a peak derived from the LDH-like compound was detected in the range of $5° \le 2\theta \le 10°$. Since the (003) peak position of LDH is usually observed at $2\theta$=11 to 12°, the above peak is considered to be a peak such that the (003) peak of LDH was shifted to the lower angle side, which therefore indicates that the above peak is derived from a compound that is analogous to an LDH although cannot be called LDH (i.e., LDH-like compound).

Evaluation 4: The proportion of the hydroxide ion-conductive layered compound in the LDH separator was as shown in Table 8.

Evaluation 5: As shown in Table 8, the extremely high denseness such as He permeability of 0.0 cm/min. atm was confirmed.

Evaluation 6: As shown in Table 8, the higher ionic conductivity was confirmed in Examples D2 to D5 than that in Example D1 (Comparative Example).

TABLE 7

| Mg—Al, Ti, Y | Weight ratio of dip solution | | | | Concentration of raw material aqueous solution | | Hydrothermal conditions | |
| | Ti/(Y + Al) (molar ratio) | Y/Al (molar ratio) | Ion-exchanged water | Number of times of dipping | Magnesium nitrate hexahydrate x (mol/L) | Urea/$NO_3^-$ (molar ratio) = y | Hydrothermal temperature (° C.) | Hydrothermal time (h) |
|---|---|---|---|---|---|---|---|---|
| Example D1* | 2 | 8 | 5 | 1 | 0.0075 | 96 | 120 | 16 |
| Example D2 | 2 | 8 | 1 | 1 | 0.0075 | 96 | 120 | 16 |
| Example D3 | 2 | 8 | 0 (no addition) | 1 | 0.0075 | 96 | 120 | 16 |
| Example D4 | 2 | 8 | 0 (no addition) | 2 | 0.0075 | 96 | 120 | 16 |
| Example D5 | 2 | 8 | 0 (no addition) | 3 | 0.0075 | 96 | 120 | 16 |

*denotes a Comparative Example.

was in contact with both sides of the substrate. Thereafter, an LDH-like compound was formed on the surface and the inside of the substrate by subjecting it to hydrothermal treatment at a hydrothermal temperature of 120° C. for 16 hours. With an elapse of the predetermined time, the substrate was taken out from the airtight container, washed with ion-exchanged water, and dried at room temperature over night to form an LDH-like compound inside pores of the porous substrate. Thus, an LDH separator was obtained.

(5) Densification by Roll Pressing

The LDH separator was sandwiched between a pair of PET films (Lumiler® manufactured by Toray Industries, Inc., thickness of 40 μm), and roll-pressed at a roll rotation speed of 3 mm/s, a roller heating temperature of 70° C., and a roll gap of 70 μm to obtain a further densified LDH separator.

(6) Various Evaluations

The obtained LDH separators underwent evaluations 1 to 6. The results were as follows.

Evaluation 1: A large number of platy shapes peculiar to LDH were confirmed.

Evaluation 2: As a result of EDS elemental analysis, Mg, Al, Ti and Y that were constituent elements of the

TABLE 8

| Mg-Al, Ti, Y | Proportion of hydroxide ion-conductive layered compound in LDH separator (% by weight) | He permeability (cm/min · atm) | Ionic conductivity (mS/cm) |
|---|---|---|---|
| Example D1* | 19 | 0.00 | 0.34 |
| Example D2 | 33 | 0.00 | 1.98 |
| Example D3 | 39 | 0.00 | 3.04 |
| Example D4 | 59 | 0.00 | 3.61 |
| Example D5 | 79 | 0.00 | 3.22 |

*denotes a Comparative Example.

Examples E1 to E5

LDH separators comprising a Ni—(Al,Ti)-LDH were fabricated and evaluated as follows.

(1) Preparation of Polymer Porous Substrate

A commercially available polyethylene microporous membrane having a porosity of 50%, an average pore diameter of 0.1 μm, and a thickness of 10 μm was prepared as a polymer porous substrate and cut out to a size of 5.0 cm×5.0 cm.

(2) Alumina•Titania Sol Coating on Polymer Porous Substrate

The substrate prepared in (1) above was coated with an amorphous alumina solution (Al-L7, manufactured by Taki Chemical Co., Ltd.) and a titania sol solution (AM-15, manufactured by Taki Chemical Co., Ltd.) by dip coating. The dip solution was prepared by mixing the amorphous alumina solution and the titania sol solution at Ti/Al (molar ratio)=2, and mixing ion-exchanged water in the weight ratio shown in Table 9 with respect to the mixed solution. The dip coating was carried out by immersing the substrate in 100 ml of the dip solution followed by carrying out a procedure of pulling it up vertically the number of times shown in Table 9. Thereafter, the dip coated substrate was dried at room temperature for 1 hour.

(3) Preparation of Raw Material Aqueous Solution

Nickel nitrate hexahydrate ($Ni(NO_3)_2 \cdot 6H_2O$, manufactured by Kanto Chemical Co., Inc.) and urea (($NH_2)_2CO$, manufactured by Sigma-Aldrich Co. LLC) were prepared as raw materials. The raw materials were weighed so that the nickel nitrate hexahydrate was 0.0075 mol/L and urea/$NO_3^-$ (molar ratio)=16 and placed in a beaker, and ion-exchanged water was added thereto to have a total volume of 80 ml. Thereafter the mixture was stirred to obtain a raw material aqueous solution.

(4) Membrane Formation by Hydrothermal Treatment

Both the raw material aqueous solution and the dip-coated substrate were sealed in a Teflon® airtight container (auto-clave container having a content of 100 ml and an outer side jacket made of stainless steel). At this time, a substrate was fixed while being floated from the bottom of the Teflon® airtight container, and installed vertically so that the solution was in contact with both sides of the substrate. Thereafter, an LDH was formed on the surface and the inside of the substrate by subjecting it to hydrothermal treatment at a hydrothermal temperature of 120° C. for 16 hours. With an elapse of the predetermined time, the substrate was taken out from the airtight container, washed with ion-exchanged water, and dried at room temperature over night to form an LDH inside the pores of the porous substrate. Thus, an LDH separator was obtained.

(5) Densification by Roll Pressing

The LDH separator was sandwiched between a pair of PET films (Lumiler® manufactured by Toray Industries, Inc., thickness of 40 μm), and roll-pressed at a roll rotation speed of 3 mm/s, a roller heating temperature of 70° C., and a roll gap of 70 μm to obtain a further densified LDH separator.

(6) Various Evaluations

The obtained LDH separators underwent evaluations 1 to 6. The results were as follows.

Evaluation 1: Multiple platy crystals characteristic of LDH were confirmed.

Evaluation 2: As a result of EDS elemental analysis, Ni, Al and Ti that were constituent elements of LDH, were detected. That is to say, these elements were confirmed to be incorporated and crystallized as a hydroxide ion-conductive layered compound.

Evaluation 3: In an XRD profile, a peak was observed in the vicinity of 20=11.5°, which was identified to be an LDH (hydrotalcites compound). The identification was carried out by using a diffraction peak of the LDH (hydrotalcites compound) described in JCPDS card No. 35-0964.

Evaluation 4: The proportion of the hydroxide ion-conductive layered compound in the LDH separator was as shown in Table 10.

Evaluation 5: As shown in Table 10, the extremely high denseness such as He permeability of 0.0 cm/min·atm was confirmed.

Evaluation 6: As shown in Table 10, the higher ionic conductivity was confirmed in Examples E2 to E5 than that in Example E1 (Comparative Example).

TABLE 9

| Ni—Al, Ti | Weight ratio of dip solution | | Concentration of raw material aqueous solution | | Hydrothermal conditions | |
|---|---|---|---|---|---|---|
| | Ti/Al (molar ratio) | Ion-exchanged water | Number of times of dipping | Nickel nitrate hexahydrate x (mol/L) | Urea/$NO_3^-$ (molar ratio) = y | Hydrothermal temperature (° C.) | Hydrothermal time (h) |
| Example E1* | 2 | 5 | 1 | 0.0075 | 16 | 120 | 16 |
| Example E2 | 2 | 1 | 1 | 0.0075 | 16 | 120 | 16 |
| Example E3 | 2 | 0 (no addition) | 1 | 0.0075 | 16 | 120 | 16 |
| Example E4 | 2 | 0 (no addition) | 2 | 0.0075 | 16 | 120 | 16 |
| Example E5 | 2 | 0 (no addition) | 3 | 0.0075 | 16 | 120 | 16 |

*denotes a Comparative Example.

TABLE 10

| Ni-Al, Ti | Proportion of hydroxide ion-conductive layered compound in LDH separator (% by weight) | He permeability (cm/min · atm) | Ionic conductivity (mS/cm) |
|---|---|---|---|
| Example E1* | 15 | 0.00 | 0.18 |
| Example E2 | 28 | 0.00 | 1.83 |
| Example E3 | 44 | 0.00 | 2.47 |
| Example E4 | 55 | 0.00 | 2.98 |
| Example E5 | 77 | 0.00 | 2.66 |

*denotes a Comparative Example.

Overview of Results

The results shown in Tables 2, 4, 6, 8, and 10 demonstrate that regardless of the constituent elements of the hydroxide ion-conductive layered compound, similar correlation was observed between the proportion of the hydroxide ion-conductive layered compound in the LDH separator and the ionic conductivity. The following tendency was observed. That is, increasing the proportion of the hydroxide ion-conductive layered compound in the LDH separator increases the ionic conductivity (i.e., the performance is enhanced), however, the ionic conductivity reaches the peak in the vicinity of the proportion of the hydroxide ion-conductive layered compound being approximately 60% by weight, and thereafter, increasing the weight of the hydroxide ion-conductive layered compound gradually reduces the ionic conductivity.

What is claimed is:

1. An LDH separator comprising a porous substrate and a hydroxide ion-conductive layered compound that is a layered double hydroxide (LDH)-like compound, filling up pores of the porous substrate, wherein a proportion of the hydroxide ion-conductive layered compound in the LDH separator is 25 to 85% by weight, wherein the LDH-like compound is a hydroxide and/or an oxide with a layered crystal structure, comprising Mg and one or more elements comprising at least Ti, selected from the group consisting of Ti, Y and Al, and wherein a surface of the LDH separator has a peak derived from the LDH-like compound in a range of $5° \leq 2\theta \leq 10°$ measured by X-ray diffraction.

2. The LDH separator according to claim 1, wherein a proportion of the hydroxide ion-conductive layered compound in the LDH separator is 30 to 85% by weight.

3. The LDH separator according to claim 1, wherein the hydroxide ion-conductive layered compound is an LDH and the LDH is composed of a plurality of hydroxide base layers comprising Mg, Al, Ti, and OH groups and interlayers composed of anions and $H_2O$, interposed between the plurality of hydroxide base layers.

4. The LDH separator according to claim 3, wherein the LDH is composed of Mg, Al, Ti and OH groups, or is composed of Mg, Al, Ti, OH groups and unavoidable impurities.

5. The LDH separator according to claim 3, wherein the LDH or the hydroxide base layer further comprises Y and/or Zn.

6. The LDH separator according to claim 1, wherein the hydroxide ion-conductive layered compound is an LDH and the LDH is composed of a plurality of hydroxide base layers comprising Ni, Al, Ti, and OH groups and interlayers composed of anions and H2O, interposed between the plurality of hydroxide base layers.

7. The LDH separator according to claim 1, wherein the porous substrate is composed of a polymer material.

8. The LDH separator according to claim 7, wherein the polymer material is selected from the group consisting of polystyrene, polyether sulfone, polypropylene, an epoxy resin, polyphenylene sulfide, a fluororesin, cellulose, nylon, and polyethylene.

9. A zinc secondary battery comprising the LDH separator according to claim 1.

10. A solid alkaline fuel cell comprising the LDH separator according to claim 1.

* * * * *